(12) United States Patent
Quenard et al.

(10) Patent No.: US 10,783,372 B2
(45) Date of Patent: Sep. 22, 2020

(54) METHOD FOR IMAGING A CORN EAR AND APPARATUS FOR IMPLEMENTING SUCH METHOD

(71) Applicant: BIOGEMMA, Paris (FR)

(72) Inventors: Nicolas Quenard, Chavaroux (FR); Arnaud Susset, Saint-Maur-des-Fosses (FR)

(73) Assignee: BIOGEMMA, Paris (FR)

( * ) Notice: Subject to any disclaimer, the term of this patent is extended or adjusted under 35 U.S.C. 154(b) by 0 days.

(21) Appl. No.: 15/746,602

(22) PCT Filed: Jul. 28, 2016

(86) PCT No.: PCT/EP2016/068078
§ 371 (c)(1),
(2) Date: Jan. 22, 2018

(87) PCT Pub. No.: WO2017/021285
PCT Pub. Date: Feb. 9, 2017

(65) Prior Publication Data
US 2018/0218215 A1 Aug. 2, 2018

(30) Foreign Application Priority Data

Jul. 31, 2015 (EP) .................................... 15306248

(51) Int. Cl.
*G06K 9/00* (2006.01)
*G01N 21/85* (2006.01)
(Continued)

(52) U.S. Cl.
CPC .......... *G06K 9/00657* (2013.01); *B07C 5/342* (2013.01); *G01N 21/85* (2013.01);
(Continued)

(58) Field of Classification Search
None
See application file for complete search history.

(56) References Cited

U.S. PATENT DOCUMENTS

| 6,947,144 B2 | 9/2005 | Kim et al. |
| 2003/0094403 A1 | 5/2003 | Murata et al. |

(Continued)

FOREIGN PATENT DOCUMENTS

| CN | 104384116 A | 3/2015 |
| JP | 2011/088096 A | 5/2011 |

(Continued)

OTHER PUBLICATIONS

International Search Report from counterpart Application No. PCT/EP2016/068078; report dated Sep. 23, 2016.
(Continued)

*Primary Examiner* — Dakshesh D Parikh
(74) *Attorney, Agent, or Firm* — Miller, Matthias & Hull LLP

(57) ABSTRACT

Method for imaging a corn ear having an outer surface, the method implementing an imaging module having a field of view that enables an image of the outer surface of the corn ear to be acquired, the method comprising the step consisting in dropping the corn ear within the field of view of the imaging module and acquiring an image of the outer surface of the corn ear while the corn ear drops within the field of view of the imaging module.

12 Claims, 12 Drawing Sheets

(51) Int. Cl.
- *B07C 5/342* (2006.01)
- *G06T 1/00* (2006.01)
- *G06T 7/00* (2017.01)
- *H04N 5/235* (2006.01)
- *G01N 21/84* (2006.01)
- *A01D 45/02* (2006.01)

(52) U.S. Cl.
CPC .......... *G06T 1/0014* (2013.01); *G06T 7/0008* (2013.01); *H04N 5/2354* (2013.01); *A01D 45/02* (2013.01); *B07C 2501/009* (2013.01); *G01N 2021/8466* (2013.01); *G06T 2207/30188* (2013.01)

(56) References Cited

U.S. PATENT DOCUMENTS

| | | |
|---|---|---|
| 2012/0228199 A1 | 9/2012 | Modiano et al. |
| 2012/0260618 A1* | 10/2012 | Alley ............... A01D 45/02 56/14.7 |
| 2013/0081982 A1* | 4/2013 | Tanaka ............... B07C 5/3425 209/552 |
| 2014/0376782 A1 | 12/2014 | Li et al. |
| 2015/0160139 A1* | 6/2015 | Calcoen ............... G01N 23/20 348/91 |

FOREIGN PATENT DOCUMENTS

| | | |
|---|---|---|
| JP | 2011/104470 A | 6/2011 |
| JP | 2014/157119 A | 8/2014 |
| WO | WO 2009/023110 A1 | 2/2009 |
| WO | WO 2014/109993 A2 | 7/2014 |

OTHER PUBLICATIONS

Steward C. N. "*The utility of green fluorescent protein in transgenic plants*", Plant Cell Rep (2001) 20:376-382.

Bell P. and al., A comparative analysis of novel fluorescent proteins as reporters for gene transfer studies. Journal of Histochemistry & Cytochemistry (2007) vol. 55(9):931-939.

* cited by examiner

| Reference of the ear | Measured volume (cm³) | Volume with 5 cameras (cm³) | Deviation with respect to the measured volume (%) | Volume with 7 cameras (cm³) | Deviation with respect to the measured volume (%) | Volume with 11 cameras (cm³) | Deviation with respect to the measured volume (%) |
|---|---|---|---|---|---|---|---|
| 1 | 274 | 265 | 3 | 249 | 9 | 270 | 1 |
| 2 | 218 | 191 | 12 | 217 | 0 | 218 | 0 |
| 3 | 234 | 224 | 4 | 222 | 5 | 231 | 1 |
| 4 | 199 | 183 | 8 | 185 | 7 | 196 | 2 |
| 5 | 214 | 193 | 10 | 203 | 5 | 209 | 2 |
| 6 | 209 | 191 | 9 | 202 | 3 | 209 | 0 |
| 7 | 242 | 220 | 9 | 254 | 5 | 241 | 0 |
| 8 | 139 | 128 | 8 | 135 | 3 | 137 | 2 |

FIG. 9

METHOD FOR IMAGING A CORN EAR AND APPARATUS FOR IMPLEMENTING SUCH METHOD

FIELD OF THE DISCLOSURE

The invention relates to a method for imaging a corn ear and to an apparatus for implementing such method.

BACKGROUND OF THE DISCLOSURE

The invention finds advantageous applications, especially but not exclusively, in the field of agronomic research as well as in the field of agriculture for phenotyping corn ears.

In these fields, corn plants of different varieties, including for example corn plants from various genetic origin, varieties or populations, corn plants deriving from any step in breeding and genetically modified corn plants, may be grown in a soil or any appropriate growing medium of a crop area and especially an open field, greenhouse, phytotron or other more or less controlled environment. Phenotyping these ears enables an evaluation of one or several traits of the corn plant. The traits of corn ears of different plants can then be compared with each other, for example, to be able to select the corn ear in accordance with specific needs. Among the possible traits of the corn ear, one can cite: an ear length, an ear width, an ear total area of the outer surface, an ear volume, a number of kernel rows, a kernel number, a kernel length, a kernel width, a kernel area, an ear length of filled kernels, an ear filled kernel area, an ear cob area, an ear area of aborted kernels and an ear fertilized volume.

Based on the traits of several corn ears picked in a same crop area, such as a corn field, a yield of the whole crop area may also be predicted.

To save time in phenotyping a corn ear, automated or semi-automated methods based on an acquisition and a processing of an image of the corn ear have been developed in replacement of manual methods implementing manual measurement steps. WO 2009/023110 discloses such a known automated or semi-automated method in which an image of the corn ear resting on a conveyor is acquired for subsequent processing.

However, in this known method, image acquisition can only be performed at a limited rate corresponding to a speed of the conveyor. The known method does not provide a high throughput acquisition of image data of the corn ear. In addition, only a portion of an outer surface of the corn ear facing an imaging device, such as a camera, can be acquired. The known method only provides an acquisition of partial image data of the corn ear that does not enable an accurate and reliable subsequent processing.

SUMMARY OF THE INVENTION

The invention aims at solving the above mentioned problems.

To this end, according to a first aspect, the invention provides a method for imaging a corn ear having an outer surface, the method implementing an imaging module having a field of view that enables an image of the outer surface of the corn ear to be acquired, the method comprising the step consisting in dropping the corn ear within the field of view of the imaging module and acquiring an image of the outer surface of the corn ear while the corn ear drops within the field of view of the imaging module. This corn ear may be mature or immature (from silking to 20 days after pollination).

Hence, the invention enables an image of the whole outer surface of the corn ear to be acquired as it falls freely, namely without contact with any part of the apparatus. The invention then permits a high throughput acquisition of image data of the corn ear as well as a high throughput, accurate and reliable subsequent processing of the image data.

The field of view of the imaging module may be outwardly delimited by a surface of revolution, especially a cylindrical surface, along a vertical axis. During the step of dropping the corn ear and acquiring the image, the corn ear may be dropped along the vertical axis of the field of view.

The field of view of the imaging module may have a vertical length along the vertical axis that is superior to a maximum size of the corn ear, and especially its length. In another way to implement the invention, the imaging device contains high frame rate camera to acquire successive image in the longitudinal axis of the same ear.

The corn ear may extend along a longitudinal axis. During the step of dropping the corn ear and acquiring the image, the longitudinal axis of the corn ear may be substantially aligned with the vertical axis of the field of view.

The imaging module may comprise a frame having a central axis and a plurality of imaging devices mounted on the frame about the central axis, each imaging device having an elementary field of view that enables an elementary image of a portion of the outer surface of the corn ear to be acquired, the imaging devices being arranged so that a composition of the elementary images forms the image of the outer surface of the corn ear. During the step of dropping the corn ear and acquiring the image, the corn ear is dropped along the central axis of the frame. The elementary images of portions of the outer surface of the corn ear may be acquired simultaneously. These particular provisions allow special organisation of the apparatus to be adapted for example on a corn picker. But the elementary images of portions of the outer surface of the corn ear could also be acquired in any other appropriate manner, and especially successively with an adapted image processing. For example, the elementary image of a portion of the outer surface of the corn ear can issue from successive images from a high frame rate image acquisition.

The imaging module further comprises at least one lightening device adapted to lighten the outer surface of the corn ear with a light at a wavelength enabling a trait of the corn ear to be revealed on at least one of the elementary images of portions of the outer surface of the corn ear, and during the step of dropping the corn ear and acquiring the image, for each imaging device, light is emitted towards the outer surface of the corn ear. This lightening device may be mounted on the frame but other means of lightening can be used if the lightening device provide a uniform lighting of the ear during the fall by the use for example of light reflective surface. The lightening device may be composed of multiple lightening devices. In a particular way of the invention, lightening may be a continuous lightening but also light pulse. Light pulse allows a more powerful lightening during a shorter period which involves less energy. Pulse lightening may also limit heat increase on the imaging module. And light pulse may be a way to control an imaging device exposure.

One or several lightening devices may be mounted on the frame about the central axis, each lightening device being associated with one of the imaging devices and adapted to lighten the portion of the outer surface of the corn ear with a light at a wavelength enabling a trait of the corn ear to be revealed on the elementary image of said portion of the outer surface of the corn ear. During the step of dropping the corn ear and acquiring the image, for each imaging device, light may be emitted towards the portion of the outer surface of the corn ear. When images are taken successively, the lightening device may be activated to emit light successively, synchronously with the associated imaging device.

The at least one lightening device may comprise at least a first lightening device adapted to emit a first light pulse at a first wavelength enabling a first trait of the corn ear to be revealed, and a second lightening device adapted to emit a second light pulse at a second wavelength enabling a second trait of the corn ear to be revealed, wherein each imaging device is adapted to acquire a series of images according to a control signal comprising successive exposition pulses separated by time intervals, and wherein during the step of dropping the corn ear and acquiring the image, for each imaging device, one first light pulse is emitted towards the outer surface of the corn ear during a first exposition pulse, and one second light pulse is emitted towards said outer surface of the corn ear during a second subsequent exposition pulse. Light pulse can be shorter than exposition pulse and so it can be equal to zero, and the two exposition pulse can be immediately consecutive.

The imaging module can also contain two or more set of imaging devices organised on an alternative, staggered way or on too parallel frame and successive imagining can be performed alternatively by one or the other set of imaging device.

The plurality of lightening devices may comprise at least first lightening devices adapted to emit first light pulses at a first wavelength enabling a first trait of the corn ear to be revealed, and second lightening devices adapted to emit second light pulses at a second wavelength enabling a second trait of the corn ear to be revealed, each imaging device being associated with one of the first lightening devices and one of the second lightening devices. Each imaging device may be adapted to acquire series of images according to a control signal comprising successive exposition pulses separated by time intervals. During the step of dropping the corn ear and acquiring the image, for each imaging device, one first light pulse may be emitted towards the portion of the outer surface of the corn ear at the end of one of the exposition pulses, and one second light pulse may be emitted towards said portion of the outer surface of the corn ear at the beginning of the following exposition pulse.

Light used in the context of the invention may be any electromagnetic wave from X ray to microwave. Imaging device may be any sensor proper to the wave of the light used as described above (CCD camera, CMOS camera, multispectral camera, hyperspectral imaging camera, spectrometer).

Each lightening device may emit a light pulse of a duration $d=a*r/v$
where a is an integer,
r is a resolution of the imaging device,
v is a speed at which the corn ear drops within the elementary field of view of the imaging device.

A detector may be associated to the imaging device and, possibly, to the lightening device to detect an introduction of the ear in the imaging module so as to trigger image acquisition and, possibly, to coordinate the action of the lightening and the image acquisition. The detector may be any kind of sensor, especially of laser sensor, possibly associated to a photo diode (telemeter laser, profilometer laser), or a dedicated camera. The sensor can also be a force transductor associated to any of the preceding devices, in particular the device for orientation of the ears in the imaging module.

The method may further comprise the steps consisting in:
picking the corn ear in the crop area,
implementing the imaging module in a crop area on which corn ears are harvested and the step of dropping the corn ear and acquiring the image being performed in the crop area.

The apparatus may be moveable in the crop area, such as a corn field, and may be linked to a picking module adapted to pick the corn ear from the corn field and to convey said corn ear towards a dropping area where said corn ear drops within the field of view of the imaging module. During the step of picking the corn ear, the apparatus may be moved along the corn field and the corn ear is picked by the picking module. More preferably the apparatus may be directly adapted to a pulled or automotive corn picker. This corn picker can be a two row corn picker and one module can be associated to each row in this particular device.

A husking of the corn ear may be done in the last part of the corn picker, on a husking table for example. In a particular way of doing the invention, the image processing allows to check ear husking so images from partially husked ear can be process differentially (with an error suspicion).

According to a second aspect, the invention provides a method for phenotyping at least one corn ear comprising the steps consisting in:
implementing the method for imaging the corn ear as previously defined, and
processing the image of the outer surface of the corn ear to evaluate at least one trait of the corn ear, said trait being in particular chosen among: an ear length, an ear width, an ear total area of the outer surface, an ear diameter and ear volume, a number of kernel rows, a kernel number, a kernel length, a kernel width, a kernel area, an ear length of filled kernels, an ear filled kernel area, an ear cob area, an ear area of aborted kernels and an ear fertilized volume. The number of ears following within the imaging module can be scored by the imaging device. Some susceptibility to disease may also impact the ear and this method allows identification of disease symptoms, destroyed or eaten part of the ear or the cob, pop kernels, mycotoxins presence on the ear can also be detected as well as partially husking. Identification and characterization of the variety can also be achieved by this method, in particular with kernel colour data.

In the context of the invention: "Ear volume" means total volume of ear in cubic centimeter; "Kernel length" is a dimension of an edge of the kernel perpendicular to the longitudinal axis of the ear; "Kernel width" is a dimension of an edge of the kernel parallel to the longitudinal axis of the ear; "Ear length of filled kernels" is the ear length of the corn ear, excluding the ear length with aborted kernel; "Ear filled kernel area" is the surface of the corn ear, as sum of the area of the kernels; "Ear area of the aborted kernels" is the area of the section of the ear with aborted kernels; "Ear fertilized volume" is the volume of the ear in cubic centimeter excluding the section of the ear with aborted kernels. These information can for example be an indicator of susceptibility of the plant to an abiotic stress.

The step of processing the image may comprise a reconstruction in three-dimensions of the corn ear.

When the imaging module comprises a plurality of imaging devices mounted about a central axis of a frame, the reconstruction in three-dimensions of the corn ear may comprise a segmentation of each elementary image to extract a contour of the portion of the outer surface of the corn ear, and a triangulation of the contours of the portions of the outer surface of the corn ear extracted from the elementary images.

The step of processing the image may comprise a reconstruction in three-dimensions of kernels of the corn ear.

When the imaging module comprises a plurality of imaging devices mounted about a central axis of a frame, the reconstruction in three-dimensions of the kernel of the corn ear may comprise a segmentation and a filtering of each elementary image to extract boundaries between kernels of the portion of the outer surface of the corn ear, and a 3D reconstruction of the boundaries between kernels of the portions of the outer surface of the corn ear extracted from the elementary images.

A detection step of residual husks and residual silk may be done to be able to improve the image analysis process. The harvest of the ears can produce mechanical damage on the ear and partial shelled area should be detected in particular on the bottom part of the ear. Image analysis is done to identify these parts. Correction on the number of kernels and various parameters on the ears can be done by deducing the information about the probable number of kernels on this damaged part.

The reconstruction in three-dimensions of the corn ear on kernel positions may further comprise a filtering of redundant kernels in the elementary images of portions of the outer surface of the corn ear.

The steps of implementing the method for imaging the corn ear and of processing the image of the outer surface of the corn ear may be performed for a plurality of corn ears from a same crop area, such as a corn field. The method may further comprise a step consisting in predicting a yield for said crop area.

Yield prediction for a new variety is currently done on a plot experiment, plot is a crop area with a minimum size to do an accurate observation of the variety with reduced cost. The yield for a variety is currently estimated with the grain yield obtained from this plot. The patented method allows yield estimation from an ear, and then the described method allows yield estimation from a subset of ears from the plot. If these ears are taken in a central part of the plot, this estimation can prevent edge effects. The observed correlation existing between the yield estimated from the subset of ears and the grain yield obtained from the plot, allows a calculation of a predicted yield from a reduced crop area. This reduction of the crop area for yield evaluation is particularly interesting for transgenic crop or at an early step of phenotypic evaluation in breeding. But the device can also be used on a field to estimated yield variation within this area for precision farming objective.

According to a third aspect, the invention provides an apparatus for implementing the method as previously defined, the apparatus comprising an imaging module having a field of view that enables an image of an outer surface of a corn ear to be acquired.

The field of view of the imaging module may be outwardly delimited by a surface of revolution, especially a cylindrical surface, along a vertical axis. A vertical length of this cylindrical surface may be at least of a size superior to a maximum size of an ear, and especially its length along the longitudinal axis. For example, this field of view may be between 20 cm and 1 m long.

The imaging module may comprise a frame having a central axis and a plurality of imaging devices mounted on the frame about the central axis, each imaging device having an elementary field of view that enables an elementary image of a portion of the outer surface of the corn ear to be acquired, the imaging devices being arranged so that a composition of the elementary images forms the image of the outer surface of the corn ear.

The imaging module may further comprise at least one lightening device adapted to lighten the outer surface of the corn ear with a light at a wavelength enabling a trait of the corn ear to be revealed on at least one of the elementary images of portions of the outer surface of the corn ear. Lighting device may be mounted on the frame.

The imaging module may comprise a number N of imaging devices each arranged at a distance R from the central axis, in a same transverse plane perpendicular to the central axis and equally distributed about the central axis. The at least one imaging device may be associated with a lightening devices, each imaging device and associated lightening device being aligned in a direction parallel to the central axis.

The elementary field of view of each imaging device may present an angle of view $\alpha$ in the transverse plane. Two adjacent imaging devices may then be spaced apart from each other of a distance D so that $D > 2R\alpha$, with $\alpha$ in radian. In doing so, no lightening device is arranged within the elementary field of view of each imaging device. Any other appropriate arrangement of one or several lightening devices outside the elementary field of view of each imaging device could be provided.

Preferably, the number N is an odd number.

The imaging module may comprise 2n or 2n+1 imaging devices, where n is an integer and $n \geq 2$.

The imaging module may further comprise a plurality of lightening devices mounted on the frame about the central axis, each lightening device being associated with one of the imaging devices and adapted to lighten the portion of the outer surface of the corn ear with a light pulse at a wavelength enabling a trait of the corn ear to be revealed on the elementary image of said portion of the outer surface of the corn ear. Each lightening device may be controlled so that, for each imaging device, a light pulse is emitted towards the portion of the outer surface of the corn ear.

Each Lightening device can be controlled so as to emit light successively. In particular, each lightening device can be controlled synchronously with the associated imaging device fixed so that images can be acquired successively by the consecutive imaging devices respective to their position around the imaging module. This provision prevents having lightening in the field of view of the imaging device.

The at least one lightening device may comprise at least a first lightening device adapted to emit a first light pulse at a first wavelength enabling a first trait of the corn ear to be revealed, and a second lightening device adapted to emit a second light pulse at a second wavelength enabling a second trait of the corn ear to be revealed. Each imaging device may be adapted to acquire series of images according to a control signal comprising successive exposition pulses separated by time intervals. Each lightening device may be controlled so that, for each imaging device, one first light pulse is emitted towards the outer surface of the corn ear during a first exposition pulse, and one second light pulse is emitted towards said outer surface of the corn ear during a second subsequent exposition pulse. In a particular way, the first pulse is emitted at the end of the first exposition pulse and the following pulse at the beginning of the following exposition pulse.

The invention is not limited to two successive exposition pulses. One can imagine that a third exposition pulse can be used to characterize a third trait on the ear.

The plurality of lightening devices may comprise at least first lightening devices adapted to emit first light pulses at a first wavelength enabling a first trait of the corn ear to be revealed, and second lightening devices adapted to emit second light pulses at a second wavelength enabling a second trait of the corn ear to be revealed, each imaging device being associated with one of the first lightening devices and one of the second lightening devices. Each imaging device may be adapted to acquire series of images according to a control signal comprising successive exposition pulses separated by time intervals. Each lightening device may be controlled so that, for each imaging device, one first light pulse is emitted towards the portion of the outer surface of the corn ear at the end of one of the exposition pulses, and one second light pulse is emitted towards said portion of the outer surface of the corn ear at the beginning of the next exposition pulse.

Each lightening device may emit a light pulse of a duration $d=a*r/v$
where a is an integer
r is a resolution of the imaging device
v is a speed at which the corn ear drops within the elementary field of view of the imaging device.

The apparatus may be moveable and may comprise a picking module adapted to pick the corn ear from a crop area, such as a corn field, and to convey said corn ear towards a dropping area where said corn ear is dropped within the field of view of the imaging module. Two adjacent imaging modules can be adapted to a two rows corn picker.

According to a fourth aspect, the invention provides a system for implementing the method as previously defined, the system comprising:
   an apparatus as previously defined, and
   an electronic processing unit adapted to process the image of the outer surface of the corn ear to evaluate at least one trait of the corn ear, said trait being in particular chosen among: an ear length, an ear width, an ear total area of the outer surface, an ear volume, a number of kernel rows, a kernel number, a kernel length, a kernel width, a kernel area, an ear length of filled kernels, an ear filled kernel area, an ear cob area, an ear area of aborted kernels and an ear fertilized volume.

The electronic processing unit may be adapted to perform a reconstruction in three-dimensions of the corn ear.

When the imaging module comprises a plurality of imaging devices mounted about a central axis of a frame, the electronic processing unit may be adapted to perform a segmentation of each elementary image to extract a contour of the portion of the outer surface of the corn ear, and a 3D reconstruction of the contours of the portions of the outer surface of the corn ear extracted from the elementary images, so as to perform the reconstruction in three-dimensions of the corn ear.

The electronic processing unit may be adapted to perform a reconstruction in three-dimensions of the corn ear from the 3D position of kernels of the corn ear.

When the imaging module comprises a plurality of imaging devices mounted about a central axis of a frame, the electronic processing unit may be adapted to perform a segmentation and a filtering of each elementary image to extract boundaries between kernels of the portion of the outer surface of the corn ear. The center of the kernel area is determined from the extracted boundaries and a 3D reconstruction of the position of the center of the kernels of the portions of the outer surface of the corn ear extracted from the elementary images, so as to perform the reconstruction in three-dimensions of the corn ear.

In this step of processing, a first step of identification of residual husk and silks can be done to avoid misidentification of these ear or kernels. Detection of shelled area on the ear and correction of kernel number according to this identification can also be done.

The electronic processing unit may be adapted to perform a filtering of redundant kernels in the elementary images of portions of the outer surface of the corn ear, so as to perform the reconstruction in three-dimensions of the position of the kernels of the corn ear.

The electronic processing unit may be adapted to predict a yield of a crop area based on images of the outer surfaces of a plurality of corn ears of the same crop area. Grain Yield for maize is highly dependent on grain moisture. In a particular way to implement the invention, the imaging module may contain in an upper or lower part of the imaging module complementary moisture detectors adapted to detect moisture content of the ears. For example, this moisture detector is a Near infrared (NIR) camera or spectrometer a shortwave infrared range (SWIR) camera.

BRIEF DESCRIPTION OF THE DRAWINGS

Other objects and advantages of the invention will emerge from the following disclosure of a particular embodiment of the invention given as non limitative example, the disclosure being made in reference to the enclosed drawings in which:

FIG. 9 is a table illustrating an accuracy of a measurement of volume of different corn ears based on images of the corn ears acquired by the imaging module of FIGS. 2 and 8 as well as another alternative embodiment (FIG. 20) of the imaging module.

DETAILED DESCRIPTION

On the Figures, the same reference numbers refer to the same or similar elements.

Figure 1:
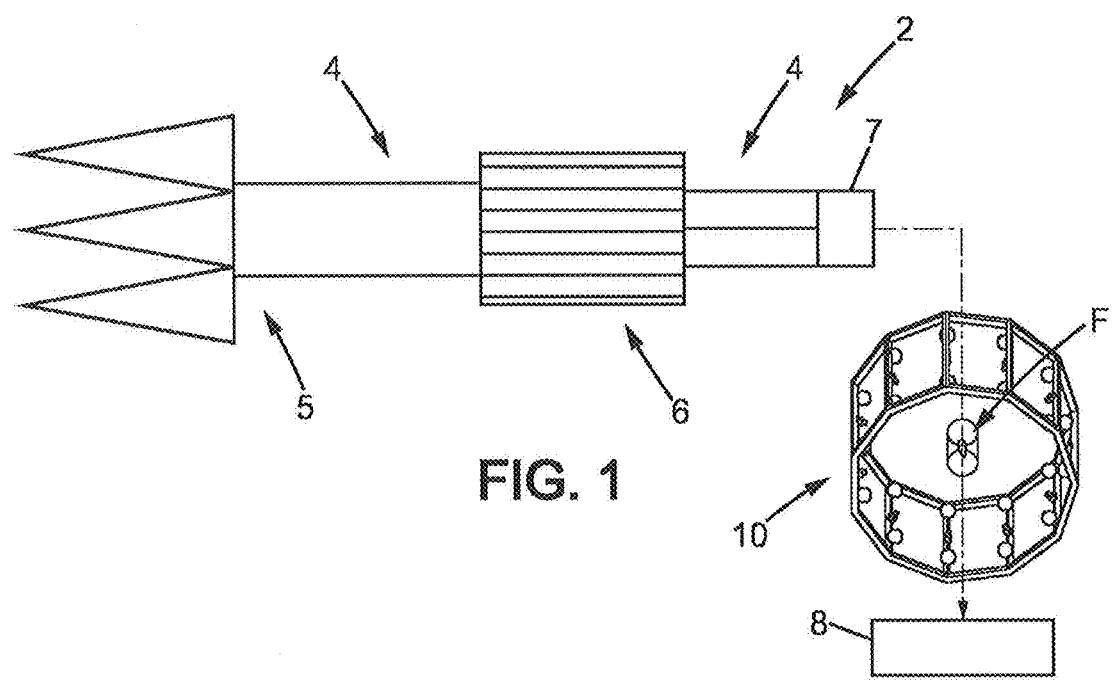
FIG. 1 is a schematic representation of an apparatus for acquiring an image of an outer surface of a corn ear grown on a crop area, such as a corn field, according to an embodiment of the invention, the apparatus being moveable with respect to the corn field and comprising a picking module adapted to pick the corn ear and an imaging module adapted to acquire an image of an outer surface of the corn ear.

FIG. 1 illustrates a first embodiment of an apparatus 2 used, in particular, in the agronomic research or agriculture field for imaging a corn ear 1 especially in view of phenotyping the corn ear, and possibly of predicting a yield.

In the illustrated embodiment, although not limited thereto, the apparatus 2 is configured as an adapted corn picker for harvesting corn plants grown on an open corn field as a crop area. The apparatus is a pulled corn picker motorized by a tractor, or more preferably an automotive corn picker not shown, so that the apparatus 2 may move with respect to the corn field. The pulled or automotive corn picker plate-form has a front end equipped with a picking module which includes:
  a corn picking head 5 configured to pick corn ears from corn plants of the corn field,
  conveyors 4 configured to convey the corn ears 1 from the picking head 5 to a husking table 6 and from the husking table 6 to a dropping area 7, and
  a container 8 arranged below the dropping area 7 to collect the corn ears 1.

The container 8 is optional and in some configuration of the apparatus 2, corn ears 1 may fall to the ground. The container may also contain a grinder to destroy corn ears 1 before falling to the ground or a sheller to shell the corn ears.

Figure 2:
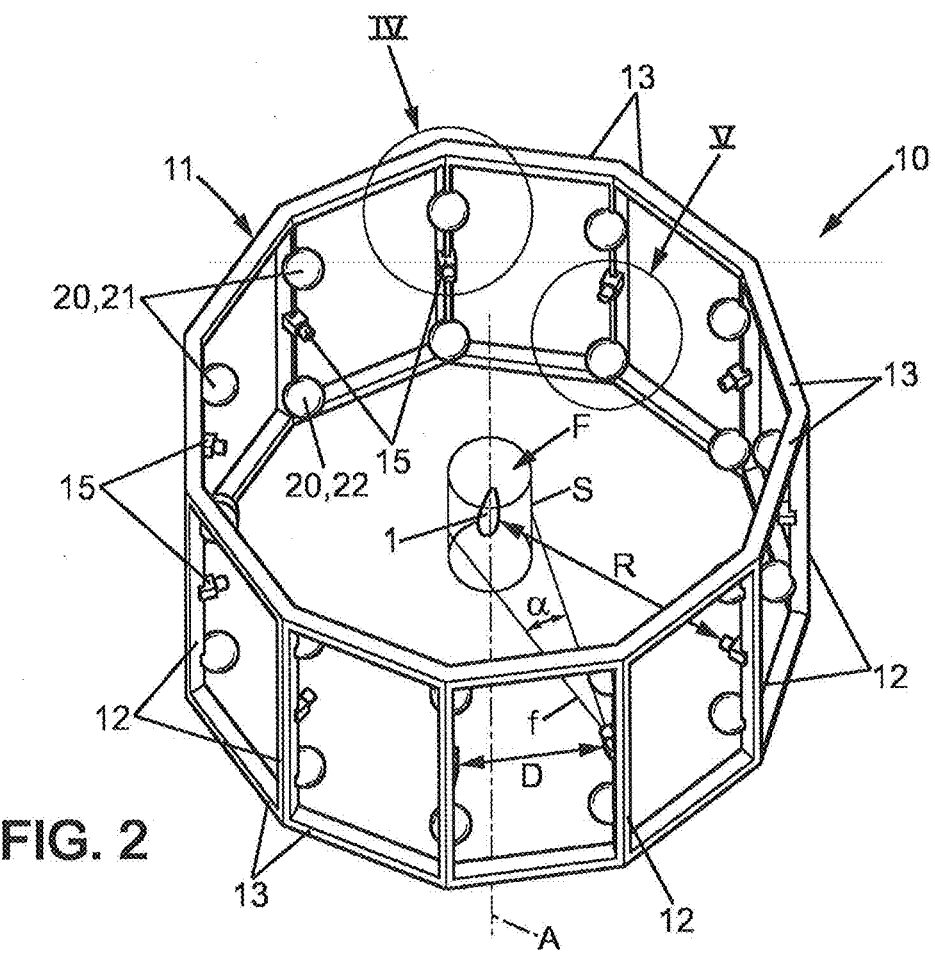
FIG. 2 is a schematic representation of the imaging module of the apparatus of FIG. 1, the imaging module comprising a plurality of imaging devices mounted about a central axis of a frame and a plurality of first and second lightening devices associated with the imaging devices.
Figure 3:
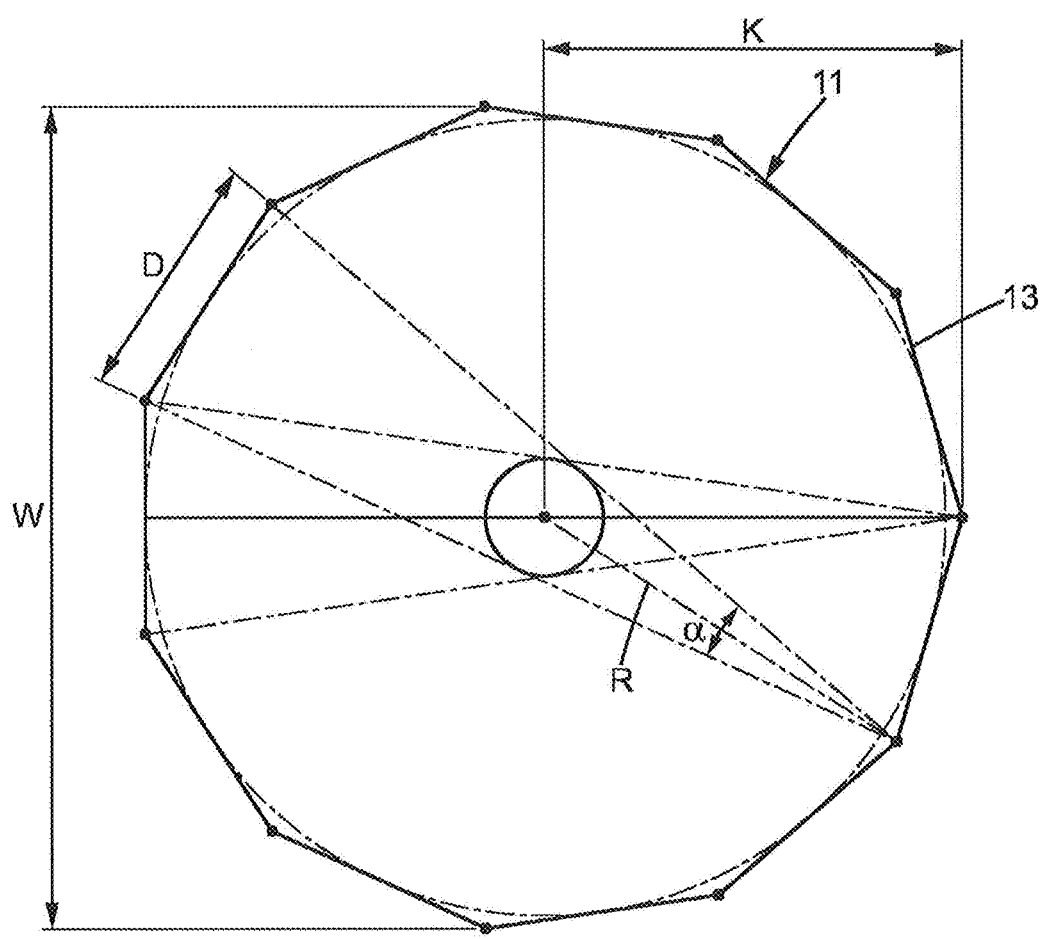
FIG. 3 is a schematic top view of the imaging module of FIG. 2.

As illustrated on FIGS. 1 to 3, the apparatus 2 further comprises an imaging module 10 interposed between the dropping area 7 and the container 8. In other embodiments, this imaging module 10 may be used independently from the apparatus 2. In particular, the imaging module 10 may be used in any suitable crop area other than a corn field, such that greenhouse, laboratory or phytotron, wherein corn ears are collected manually. The corn ears can also be dropped manually in the imaging module 10. The imagining module can also be integrated in a factory process, to control husking of the ears of for quality purpose to give quantitative elements about a seed lot, for example a sample of each ear lot can be analyse to give an estimation of lot quality. Quality of lot in the context of the invention may be the control of morphological difference between ears in order to discard ears from different genotype origin, the presence on the ear of disease symptom, mainly empty or shelled ears, presence of pop kernel on the ear.

In other embodiments, the apparatus 2 could have any suitable configuration to be implemented on any crop area, such as an open field. In a specific embodiment, the corn picker can be a two rows corn picker with two independent systems to husk and convey corn ears and two imaging modules each associated to one of the rows.

The imaging module 10 comprises a frame 11 configured to have an internal space within which the corn ears 1 may pass successively when dropping from the dropping area 7 to the container 8. In particular, the frame 11 is cylindrical of regular polygonal, especially hendecagon, cross section along a central axis A extending in a vertical direction. The frame 11 has eleven edges extending along the central axis A and formed, in the illustrated embodiment, by rods 12 equally distributed about the central axis A, at a distance R from the central axis A. The rods 12 are spaced apart from each other by a distance D. Each rod 12 is connected at opposite ends to the corresponding ends of adjacent rods 12 by bars 13 perpendicular to the rods 12.

Each edge of the frame 11 is equipped with an imaging device 15. In the illustrated embodiment, each imaging device 15 is arranged in a median portion of the corresponding rod 12. The imaging module 10 then comprises an odd number, namely eleven on FIGS. 1 and 2, of imaging devices 15 arranged in a same transverse plane perpendicular to the central axis A. Each imaging device 15 has an elementary field of view f that makes it possible to acquire an elementary image of a portion of the outer surface of the corn ear 1 dropping within the internal space of the frame 11. The elementary field of view f of each imaging device 15, the distance D between the imaging devices 15, as well as the distance R to the central axis A are chosen so that $D > 2R\alpha$ where $\alpha$ (radian) is an angle of view in the transverse plane of the elementary field of view f of each imaging device 15. Preferably, these parameters are further chosen so that a width W of the imaging module 10, namely the maximum dimension measured transversely with respect to the central axis A, remains sufficiently small to enable the imaging module 10 to be mounted on a corn picker. The width W is, for example, less than 1.75 m.

A composition of the elementary images may form a continuous image of the whole outer surface of the corn ear 1 dropping from the dropping area 7 to the container 8. The elementary fields of view f of the imaging devices 15 then define a field of view F of the imaging module 10 that enables the continuous image of the whole outer surface of the corn ear 1 to be acquired. In particular, the field of view F of the imaging module 10 is outwardly delimited by a surface of revolution S, especially a cylindrical surface, along the central axis A. In addition, thanks to the odd number of imaging devices 15 arranged according to regular polygon, at a distance D>2Rα, no imaging device 15 is present within the elementary field of view f of each imaging device 15. As it will become apparent from the following of the description, each imaging device can be associated to a lighting device and this constraint is also relevant for lighting device to avoid having a lighting device in the elementary field of view of each imaging device.

In an exemplary experimentation, the imaging module 15 has been implemented for acquiring an image of a corn ear 1 genetically modified so that kernels presenting the genetic modification exhibit fluorescence when excited with a light pulse at a suitable wavelength. Green fluorescent protein from *Aequorea Victoria* is a useful marker for genetic transformation (for a review see Steward C. N. "*The utility of green fluorescent protein in transgenic plants*", Plant Cell Rep (2001) 20:376-382). A lot of mutants and modified fluorescent proteins are available and some can be used as a non-destructive marker for transgene expression in plant and animals, each fluorescent protein been characterized by specific excitation and emission wave length (see Bell P. and al., A comparative analysis of novel fluorescent proteins as reporters for gene transfer studies. Journal of Histochemistry & Cytochemistry (2007) Vol. 55(9):931-939). An example of the in vivo use of green fluorescent protein is given in U.S. Pat. No. 6,947,144 with the visualization of transgenic rice seeds. Example of fluorescent protein used in the context of the invention is ZsGreen1 (excitation maximum at 496 nm and emission at 506 nm) but other protein as EGFP can also be used.

In this exemplary experimentation, each imaging device 15 is a near infrared (NIR) camera from Basler having a focal f of 12 mm, a depth of field F/5.6 and a resolution of 0.25 mm/pixel. The imaging devices 15 are arranged according to the above disclosed hendecagon pattern at a distance R between 750 mm and 775 mm from the central axis A and at a distance D between 410 mm and 450 mm from the adjacent imaging devices 15. The field of view F of such imaging module 10 is delimited by a cylindrical surface of 20 cm in diameter and 40 cm in height.

Figure 4:
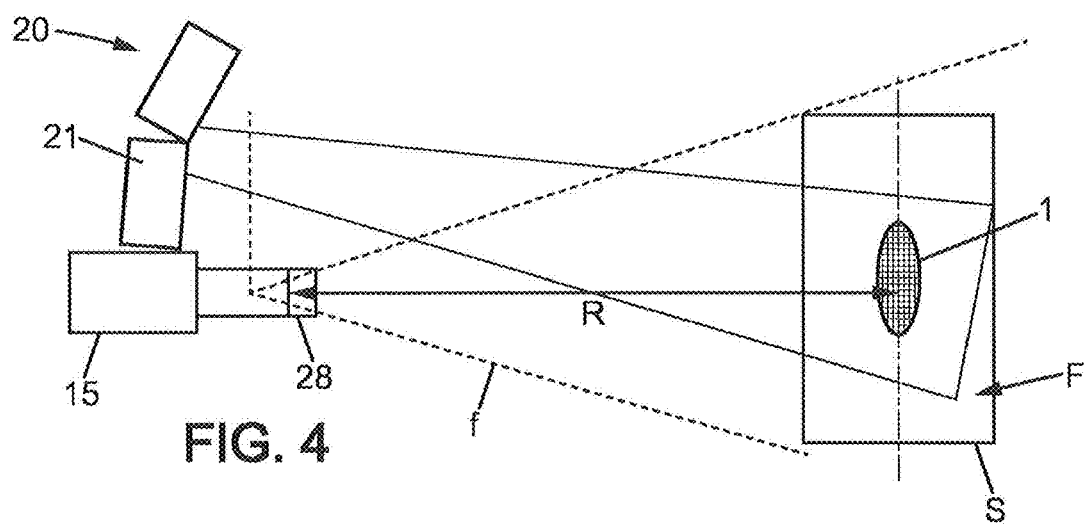
FIG. 4 is a schematic partial representation of the detail referenced IV on FIG. 2 of the imaging module of FIG. 2, illustrating one of the imaging devices and one of the first lightening devices of the imaging module.
Figure 5:
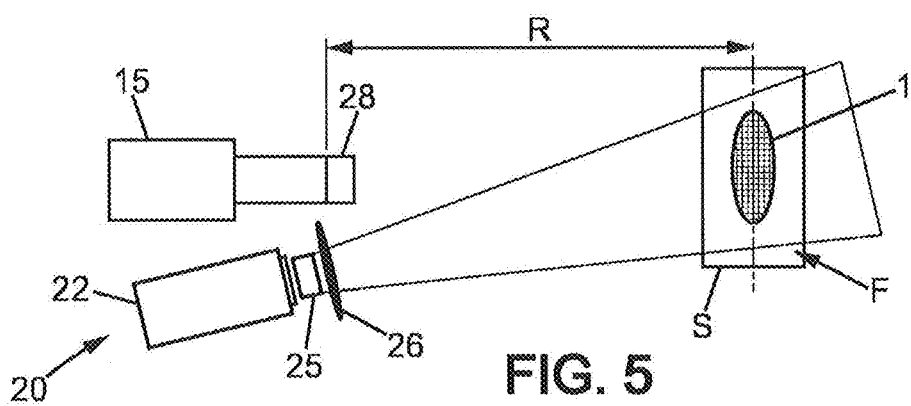
FIG. 5 is a schematic partial representation of the detail referenced V on FIG. 2 of the imaging module of FIG. 2, illustrating one of the imaging devices and one of the second lightening devices of the imaging module.

As shown on FIGS. 2, 4 and 5, the imaging module 10 further comprises a plurality of lightening devices 20 mounted on the frame 11 about the central axis A. In the illustrated embodiment, the imaging module 10 comprises first 21 and second 22 lightening devices associated with each imaging device 15 and arranged to lighten the portion of the outer surface of the corn ear 1. Each lighting device is arranged on the same scheme than the imagining device so that no lightening device is present within the elementary field of view f of each imaging device 15.

For each imaging device 15, the first lightening device 21 is mounted on a first half of the rod 12. It is adapted to emit first light pulses at a first wavelength enabling a first trait of the corn ear 1 to be revealed on the elementary image acquired by the imaging device 15. The second lightening device 22 is mounted on a second half of the rod 12. It is adapted to emit second light pulses at a second wavelength enabling a second trait of the corn ear 1 to be revealed on the elementary image acquired by the imaging device.

Figure 10:
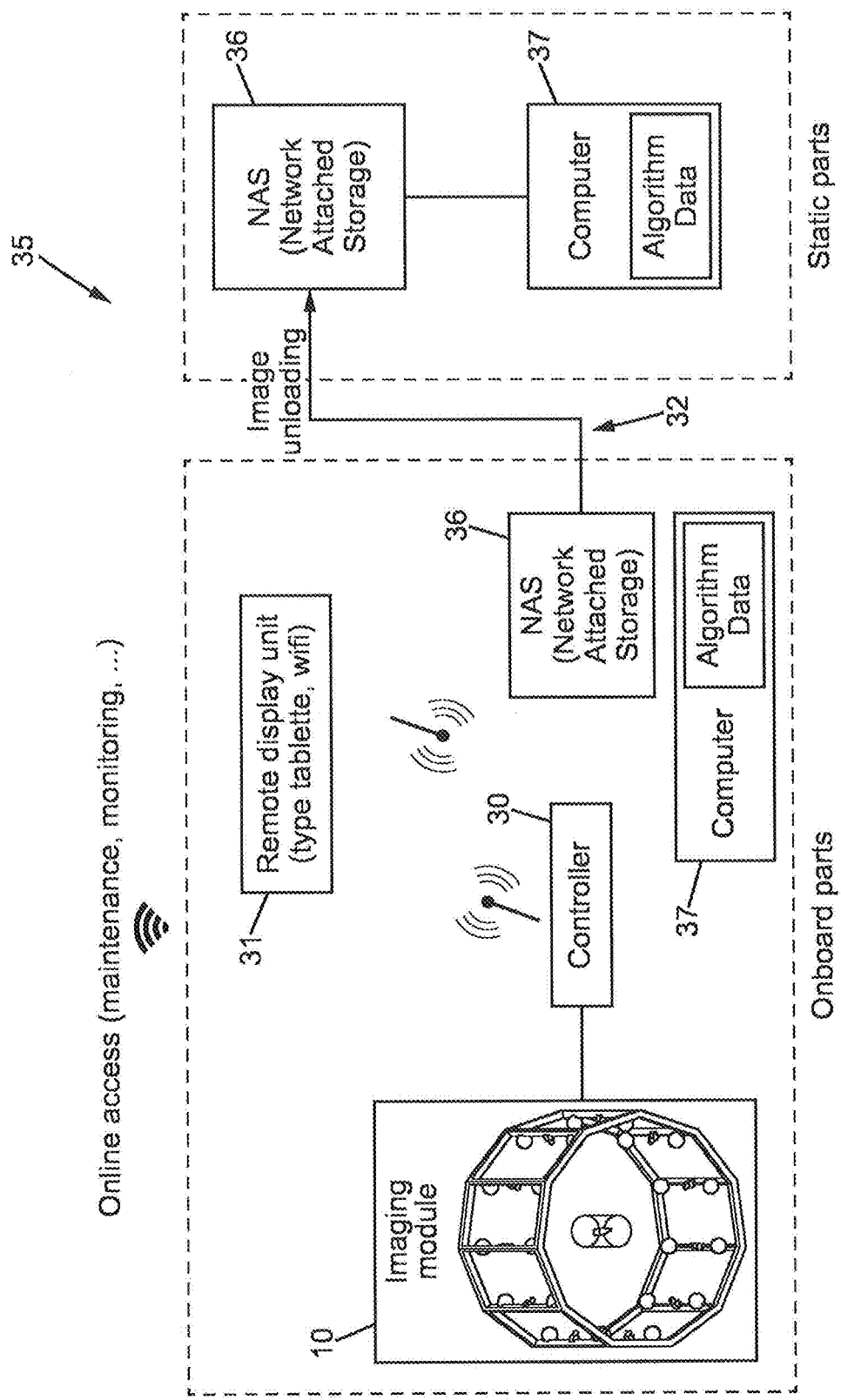
FIG. 10 is a schematic representation of a system for phenotyping the corn ear comprising the apparatus of FIG. 2 and a remote electronic processing unit adapted to process the image of the outer surface of the corn ear to evaluate at least one trait of the corn ear.

The imaging module 10 comprises a controller, illustrated on FIG. 10 as a controller 30, to which the imaging devices 15 and the lightening devices 20 are connected to control the acquisition of the image of the outer surface of the corn ear 1. The controller may be connected, and especially wirelessly connected, to a display unit 31 through which a user may control the image acquisition. The controller may then also be connected to a communication interface 36, such as network attached storage (NAS), enabling the imaging module 10 to be programmed and including a storage medium in which the acquired images can be stored for subsequent processing. The controller can be also link to a detector associated to the imaging device and, possibly, to the lightening device to detect the introduction of the ear in the imaging module so as to trigger image acquisition and, possibly, to coordinate the lightening and the image acquisition. The detector may be any kind of sensor, especially of laser sensor, possibly associated to a photo diode (telemeter laser, profilometer laser), or a dedicated camera. If two facing cameras are used, they are oriented with angle one to another comprised between 0 and 180°, preferably around 90°. In this configuration, the presence of a falling ear can be detected but also discriminated based on size, shape of this object, allowing detection of single ears and differencing ears from leaves, stalk, stem or others objects. The detector can be a 100 Hz cameras taking images in continuous. The images are transferred to an electronic processing unit to be processed. In particular, a blob detection process can be used to analyze the images and identify the type of objects based the size and shape of the object. Acquisition of images by the imaging device is activated only if the falling object is identified as an ear. Alternatively, the detector could be a force transductor associated to any of the preceding device in particular the device for orientation of the ears in the device.

The controller can also be connected to one or several complementary moisture detectors adapted to detect moisture content of the ears. For example, such moisture detector is a Near infrared (NIR) camera or spectrometer a shortwave infrared range (SWIR) camera arranged in an upper or lower part of the imaging module. Moisture detection is of particular relevance for yield prediction since yield for maize is highly dependent on moisture.

Figure 6:
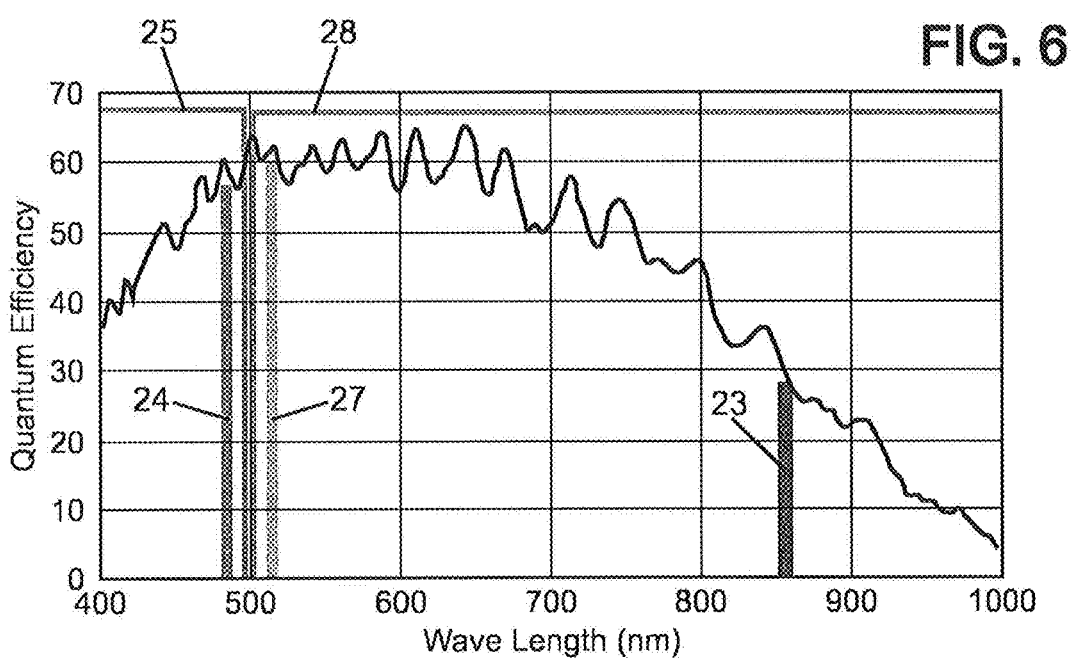
FIG. 6 is a diagram illustrating a lightening of a portion of the outer surface of the corn ear performed by first and second lightening devices.

FIG. 6 illustrates the first and second light pulses as well as the way the lightening of the portions of the outer surface of the corn ear may be performed in the exemplary experimentation. To acquire an image of the outer portion of the corn ear 1 easier to process, the first lightening devices 21 are lights IR Raymax 100-30 having of 50 W, emitting infrared light pulses 23 at a wavelength of 850 nm as first light pulses. To acquire an image of the outer portion of the corn ear 1, the second lightening devices are blue Led components 22 emitting blue light pulses 24 at a wavelength of 480 nm. Each blue Led component 22 may emit light pulses through a low pass filter 25 at 500 nm. In addition, to condense light emitted by the blue Led components 22, an optical lens 26 may be used. When exited with such second light pulses, kernels presenting the genetic modification exhibit fluorescence 27 at a wavelength of 506 nm (for ZnGreen1). In order to avoid the blue light of the blue Led components 22 to be detected while enabling the fluorescence 27 as well as Infrared light of the infrared lightening devices 21 to be detected, the cameras 15 may each be equipped with a high pass filter 28 at 500 nm.

Figure 7:
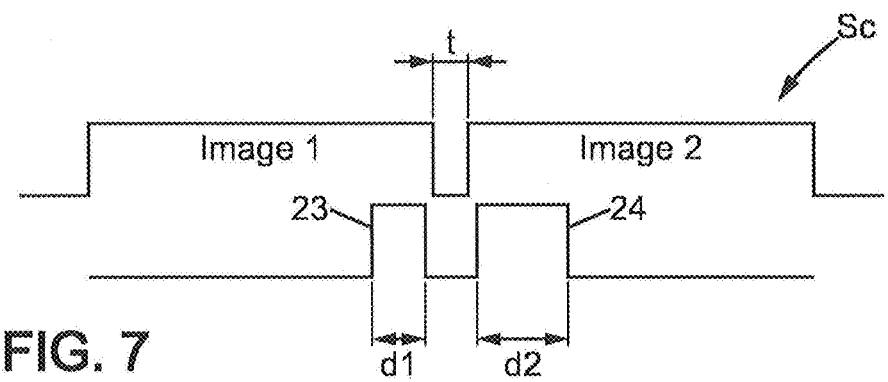
FIG. 7 is a diagram illustrating a control of an emission of first and second light pulses respectively by first and second lightening devices with respect to an image acquisition rate of the imaging device.

As shown on FIG. 7, the controller 30 sends simultaneously to each imaging device 15 a control signal Sc comprising successive exposition pulses separated by time intervals t, for example of less than 100 µs. At each exposition pulse, an elementary image is acquired by the imaging device 15. One infrared light pulse 23 is emitted towards the portion of the outer surface of the corn ear 1 at the end of one of the exposition pulses, and one blue light pulse 24 is emitted towards the portion of the outer surface of the corn ear 1 at the beginning of the next exposition pulse. In addition, each of the first 21 and second 22 lightening devices emits the corresponding infrared 23 and blue 24 light pulses of a duration d=a*r/v where a is an integer, r is the resolution of the imaging device and v is a speed at which the corn ear drops within the elementary field of view of the imaging device. In doing so, the corn ear may have the same position in two successive images acquired with the first 21 and second 22 lightening devices.

In the exemplary experimentation, the corn ear 1 drops at a speed v of 3 m/s and the cameras have a resolution r of 0.25 mm/pixel. The infrared light pulse 23 is chosen with a duration d1 of about 80 μs and the blue light pulse 24 is chosen with a duration d2 of about 320 μs.

The invention is not limited to the above disclosed configuration of the imaging module 10. In other embodiments, the imaging module could be of any other suitable configuration providing a field of view that enables an image of an outer surface of a corn ear 1 to be acquired. In particular, any other suitable appropriate arrangement of the imaging devices and of one or several lightening devices outside the elementary field of view of each imaging device could be provided. Also the outer surface of the corn ear could be enlightened with light at any appropriate wavelength to enable a trait to be visible on the acquired image of the outer surface of the corn ear.

Figure 8:
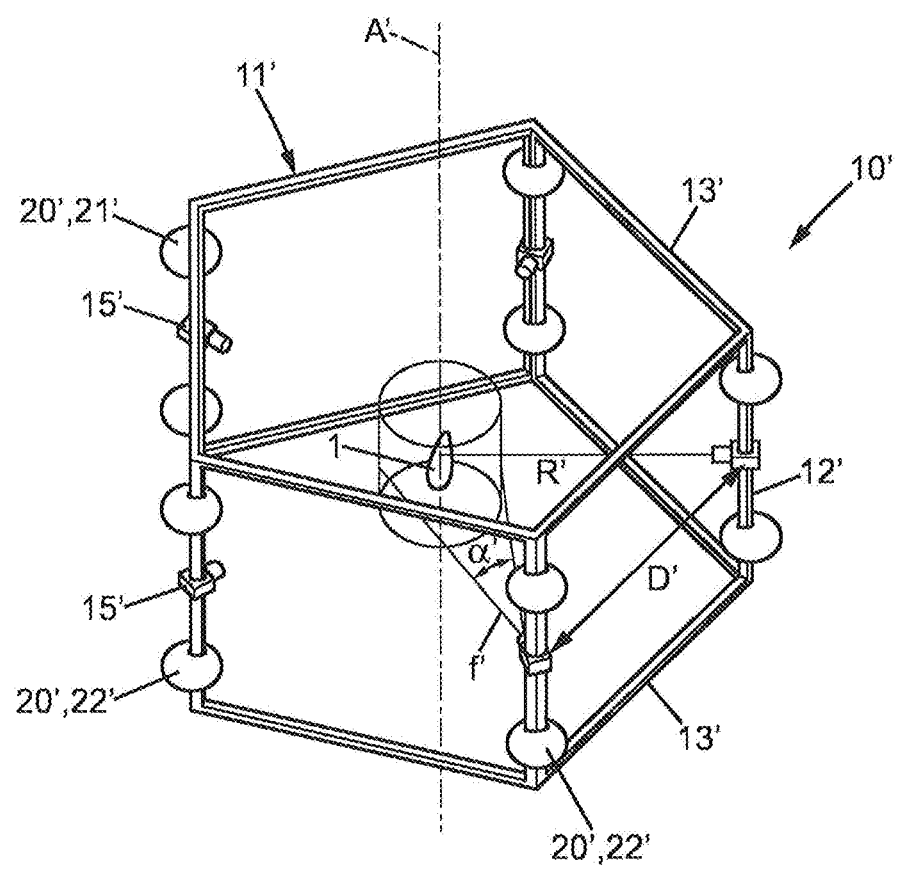
FIG. 8 is a schematic representation of an imaging module of an apparatus according to an alternative embodiment of the invention.

For example, according to a second embodiment shown on FIG. 8, the imaging module 10' may comprise five imaging devices 15' arranged in a regular pentagon. The imaging devices 15' are each arranged at a distance R' from the central axis A', in the same median transverse plane, equally distributed about the central axis A' of a distance D' so that D'>2R'α', with α' in radian. Any other suitable number of imaging devices 15', preferably odd with 2n+1 imaging devices 15', where n is an integer and n≥2, and any other suitable arrangement of the imaging devices 15' could however be provided. The same applies to the lightening devices 20' which could be mounted in any appropriate number in any appropriate arrangement to lighten the portion of the outer surface of the corn ear 1 with a light pulse at a wavelength enabling a trait of the corn ear 1 to be revealed on the elementary image.

The table of FIG. 9 shows the deviations between:
- measurements of the volumes of eight different types of corn ears based on an image acquired by an imaging module according to the invention comprising 5, 7 or 11 imaging devices and
- measurements of the volumes of the same eight corn ears based on a conventional method, such as a measurement of a moved volume of water when each of the corn ears is dipped in a bath of water.
- With a maximum deviation of 12%, the table shows that the imaging module of the invention enables an accurate measurement of the volumes of the corn ears, especially thanks to the acquisition of a continuous image of the whole outer surface of each corn ear. The table also shows that the accuracy is enhanced by increasing the number of imaging device up to an optimum configuration in which eleven imaging devices are involved.

Moreover, acquisition with several imaging devices can be adapted with specific application for 3D reconstruction from multiview to reach a more accurate measurement of the volumes of the corn ears with fewer cameras.

Figure 11:
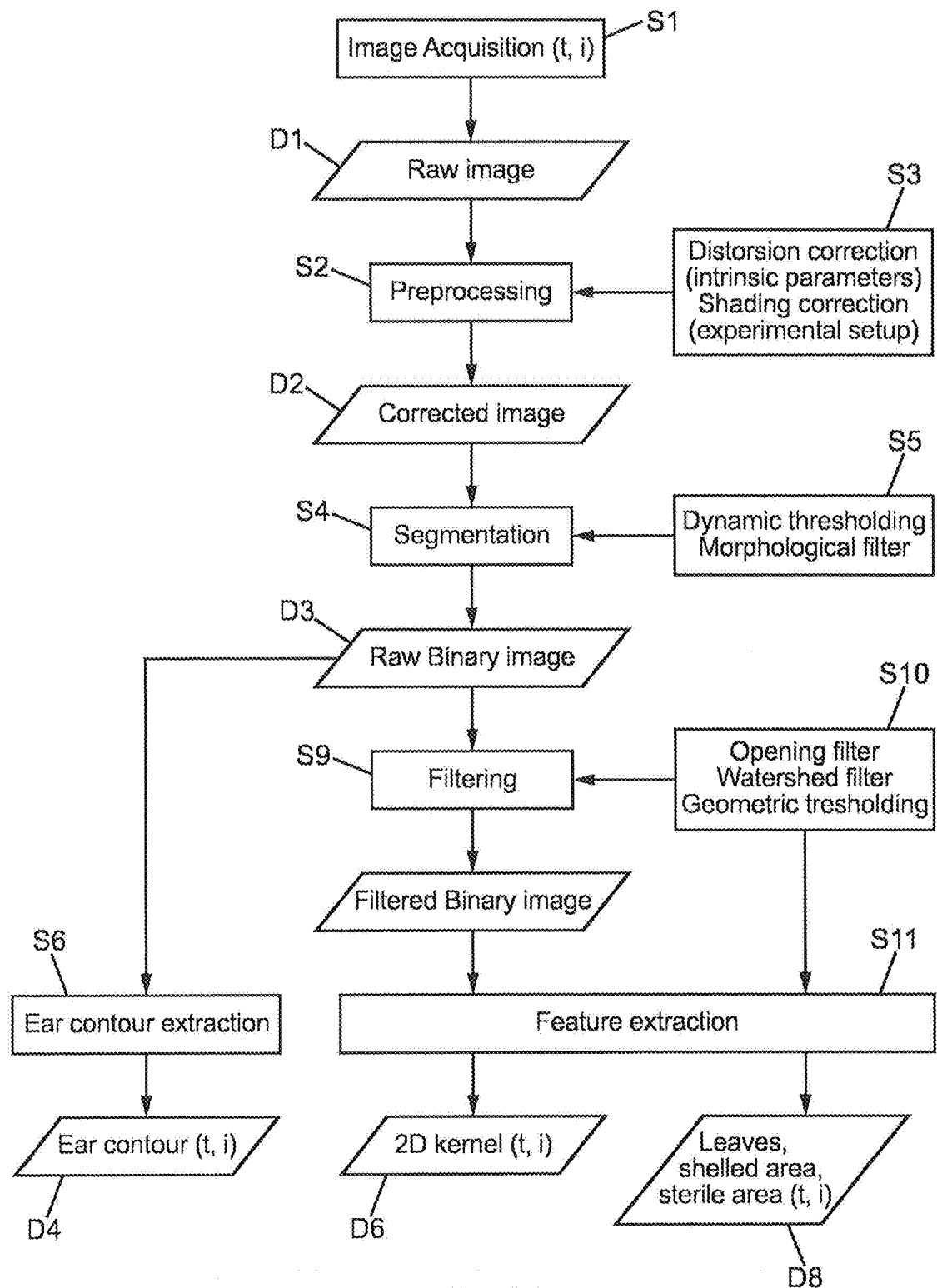
FIGS. 11 and 12 are flowcharts illustrating with rectangles steps of a method for processing the image performed by the electronic processing unit of FIG. 10, and with parallelograms the data resulting for the implementation of the previous step.
Figure 12:
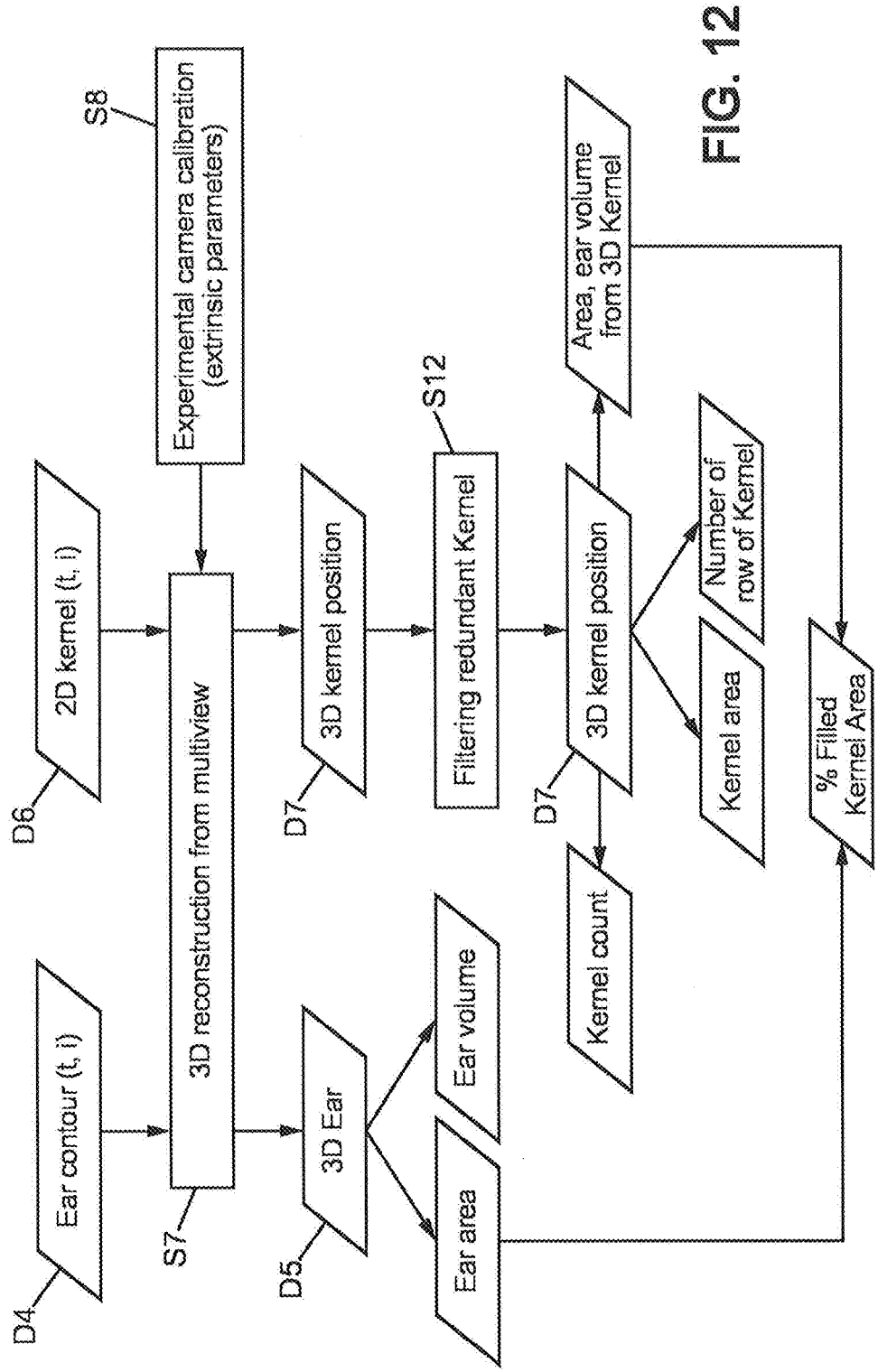
Figure 13:
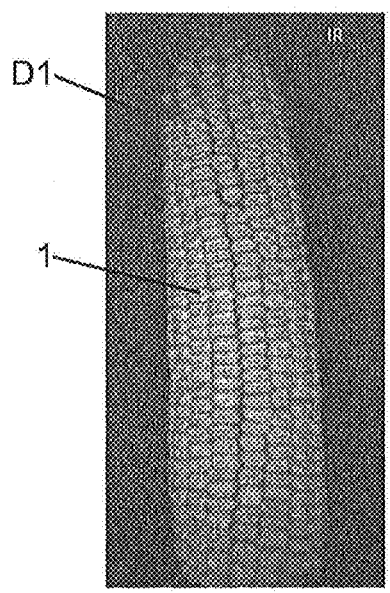
FIGS. 13 and 14 are views of a portion of the outer surface of the corn ear acquired by one of the imaging devices, the portion being lightened respectively with the first and second light pulses, FIG. 15 are views of two adjacent portions of the outer surface of the corn ear acquired by two adjacent imaging devices, the portions being lightened with the first light pulse.
Figure 14:
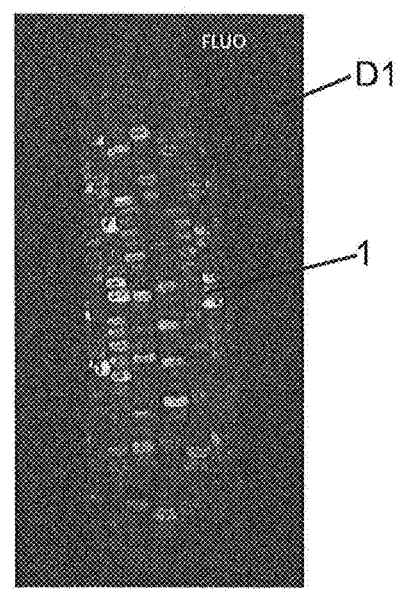
Figure 15:
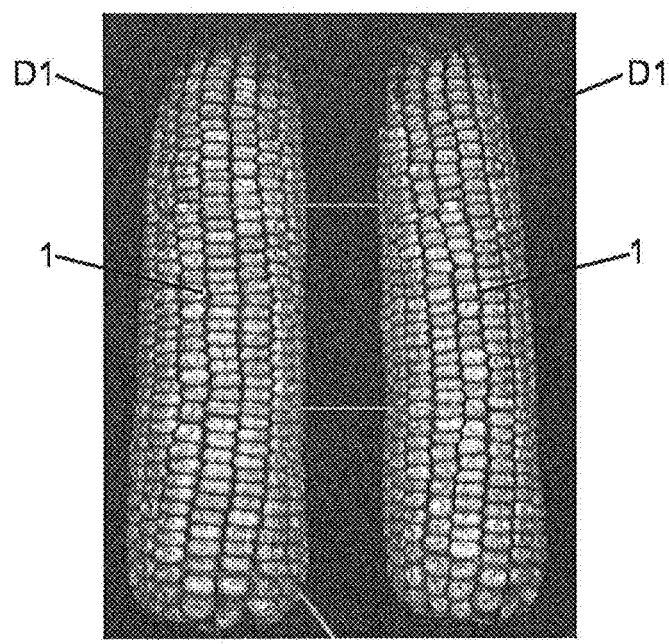

As illustrated on FIG. 10, the apparatus 10 may be part of a system 35 comprising the controller 30, the imaging module 10, a storage element (Network Attached Storage or NAS) 36 and a computer 37 for electronic processing of the image of the outer surface of the corn ear 1 according to algorithms described in FIGS. 11 and 12. The controller 30 is linked to the imaging module 10 and control images acquisition. Acquired images are stored in the NAS 36. The computer 37 includes algorithms for processing the acquired images so as to deduce corn traits number of kernels and for example predicts the yield. All these step can be follow by an operator by the remote display unit 31. In a possible way to implement the invention, the imaging module 10, the controller 30, the remote display unit 31 and one of the NAS 36 are mounted on the corn picker, and the other NAS 36 and the computer 37 are statics. A discharge of data from the NAS 36 of the corn picker to the static NAS 36 by any suitable connection 32 can be done at the end of image acquisition. Images are process on the statics part of the system. In another way to implement the invention, 37 is also embedded and image treatment is done in continuity of image acquisition and visualization can be done through remote display unit 31, by "continuity" may means that treatment is done in real time during acquisition but also that a delay exist between acquisition and treatment, treatment can also be start on the corn picker at the end of the acquisition.

Although illustrated as remote and in communication with a wireless communication interface, any other embodiment of the electronic processing unit 36 could be provided, such as an on-board electronic processing unit connected by wire or wirelessly to the controller 30 of the imaging module 10.

In relation to FIGS. 11 to 18, a method implementing the system 35 is now disclosed.

FIGS. 11 and 12 are flowcharts illustrating steps of the method from the image acquisition by the imaging module 10 to image processing by the algorithm of the computer 37 of the electronic processing unit 36.

At first, an image of an outer surface of a corn ear 1 is acquired (S1).

In the illustrated embodiment, the apparatus 2 is placed in the corn field along which it moves to pick the corn ears 1 by means of its corn picking head 5. The picked corn ears 1 are conveyed and husked by the husking table 6 towards the dropping area 7 where they drops one by one within the field of view F of the imaging module 10. The dropping area 7 is configured so that, as the corn ear drops, its longitudinal axis is substantially aligned with the central axis A of the imaging module 10 and its field of view F. Specific devices can be organized in order to maximise the orientation of the ear into the dropping area. At least one sensor may be included in the imaging module or/and in the dropping area to detect the ear fall and to set off the imaging device with the correct timing. More preferably, the sensor is a laser sensor or cameras. At predetermined times, eleven elementary images of portions of the outer surface of the corn ear 1, named as raw images D1 in the flowchart, are acquired simultaneously by the imaging devices 15. In particular, at least first raw images D1 of portions of the corn ear 1 enlightened with infrared light pulses 23 and second raw images D1 of the corn ear enlightened with blue light pulses 24 are acquired as shown on FIGS. 13 and 14 respectively. Two raw images D1 of adjacent portions of the corn ear 1 enlightened with infrared light pulses 23 are shown on FIG. 15.

Images of the outer surface of corn ears 1 may be acquired with a high through put, for example up to about 2 ears per second.

The elementary raw images D1 of portions of the outer surface of the corn ear 1 may then be processed to phenotype the corn ear 1 by evaluating one or several of its traits.

Each of the elementary raw images D1 may be pre-processed especially by distortion correction to correct geometric errors, and by shading correction to compensate lightening variations (S2). Such corrections can be made by determining intrinsic parameters (focal, distortion, main point, etc.) of the imaging devices 15 and extrinsic parameters resulting from an experimental setup during a preliminary calibration step of the imaging devices 15 (S3). The preliminary calibration step may be implemented with series of test patterns to determine the intrinsic parameters of the imaging devices 15 and the extrinsic parameters such as a 3D position of the center of each test pattern, a center of the rotation circle and a direction of a measurement plan.

Figure 16:
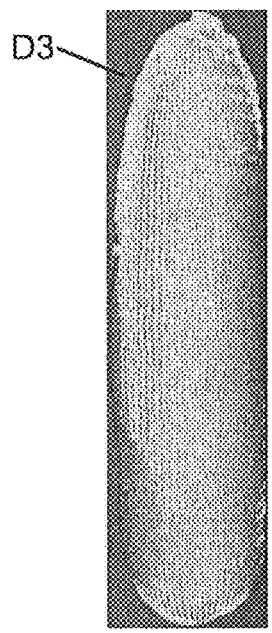
FIG. 16 is a segmented image of a portion of the outer surface of the corn ear obtained after a segmentation step performed by the electronic processing unit of FIG. 10.
Figure 17:
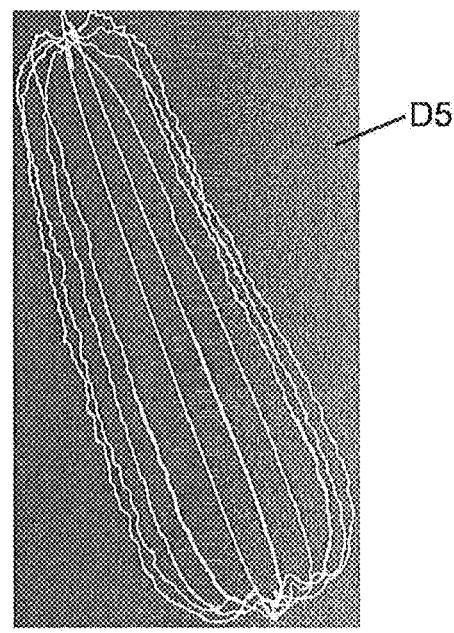
FIG. 17 is an image of a volume of the corn ear obtained by 3D reconstruction of a plurality of images of a contour of the corn ear.

The resulting elementary corrected images D2 may then be segmented (S4), especially trough dynamic thresholding followed by a series of operations of morphological filtering (55), to provide elementary raw binary images D3 of the portions of the outer surface of the corn ear 1 as shown on FIG. 16.

On the one hand, from each elementary raw binary image D3, an image D4 of the contour of the portion of the outer surface of the corn ear 1 may be extracted (S6). The images contours of the portions of the outer surface of the corn ear may be combined in a same image with the appropriate rotation deriving from the extrinsic parameters determined during the preliminary calibration step. The 3D object thus obtained, illustrated of FIG. 17, may be sampled and reconstructed from multiview so as to enable a reconstruction in three-dimensions D5 of the outer surface of the corn ear (S7, S8).

On the other hand, non-fertilized areas of the corn ear 1 may be calculated on each elementary raw binary image D3 by detecting area without kernel and within the outer surface of the corn and located at each extremity of the corn.

Figure 18A:
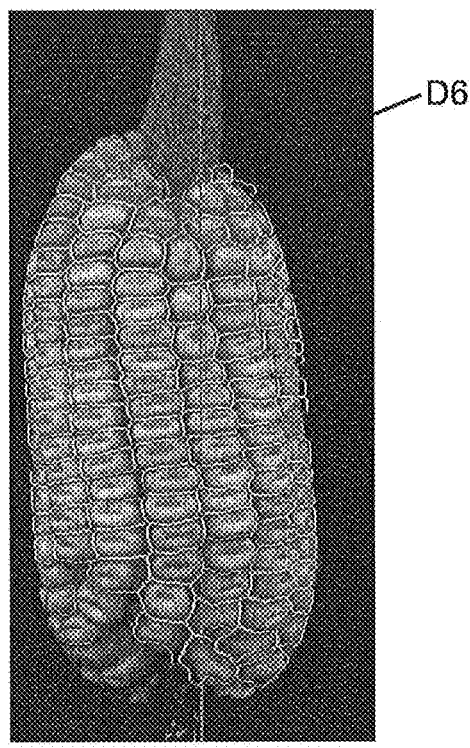
FIG. 18a is a segmented and filtered image of a portion of the outer surface of the corn ear, illustration a count of kernels of the corn ear.
Figure 18B:
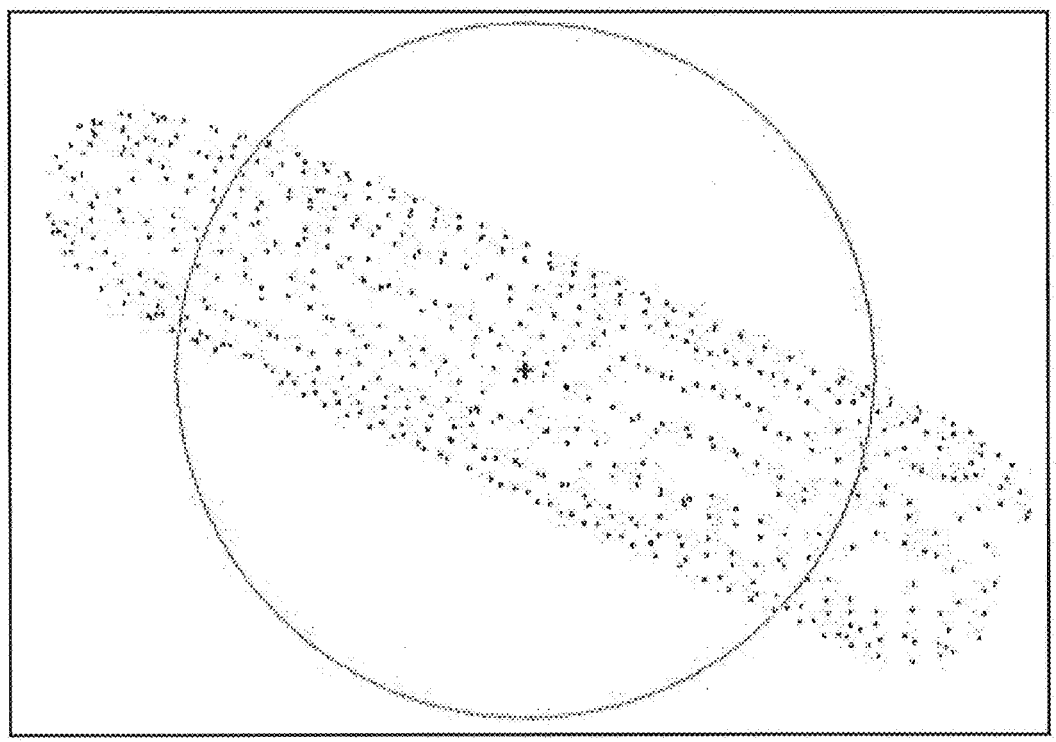
FIG. 18b is a segmented and filtered image of a portion of the outer surface of the corn ear, illustrating 3D kernel position by position of the center of the kernel area.

In addition, kernels of the fertilized area of the corn ear 1 may be extracted (S11) by subjecting each elementary raw binary image D3 to a filtering (S9) including a morphological opening, so as to enhance the boundaries between kernels, and a watershed filtering (S10). This step is critical as it allows further detection of residual husk, residual silks, shelled area due to mechanical damage produced during harvesting and non-fertilized area. Detection of residual husk and silks can be done to avoid misidentification of these kernels. Partial shelled area should be detected in particular on the bottom part of the ear. Image analysis is done to identify these parts. Correction on the number of kernels and various parameters on the ears can be done by deducing the information about the probable number of kernels in this damaged part. Further morphological operations and geometric thresholding enable detection errors to be suppressed and areas where kernels are missing to be detected. The positions and the area of the kernels can be calculated and the center position of the kernel area determined. Also the 3D reconstruction of the segmented and filtered elementary images D6 of the portions of the outer surface of the corn ear 1 enables, possibly after a filtering of redundant kernel (512), a reconstruction in three-dimension D7 of the ear from kernels position to be performed (FIG. 18b).

From the image of the outer surface of the corn ear 1 thus processed, the computer 37 of the electronic processing unit 36 may evaluate one or several traits of the corn ear 1, among which an ear length, an ear width, an total ear area of the outer surface, an ear volume, a number of kernel rows, a kernel number, a kernel length, a kernel width, a kernel area, a kernel filled area, a cob area, an area of aborted kernels and a fertilized volume.

These traits determined for a number of corn ears 1 of a determined variety grown on a same crop area makes it possible to predict a yield of the crop area.

Figure 19:
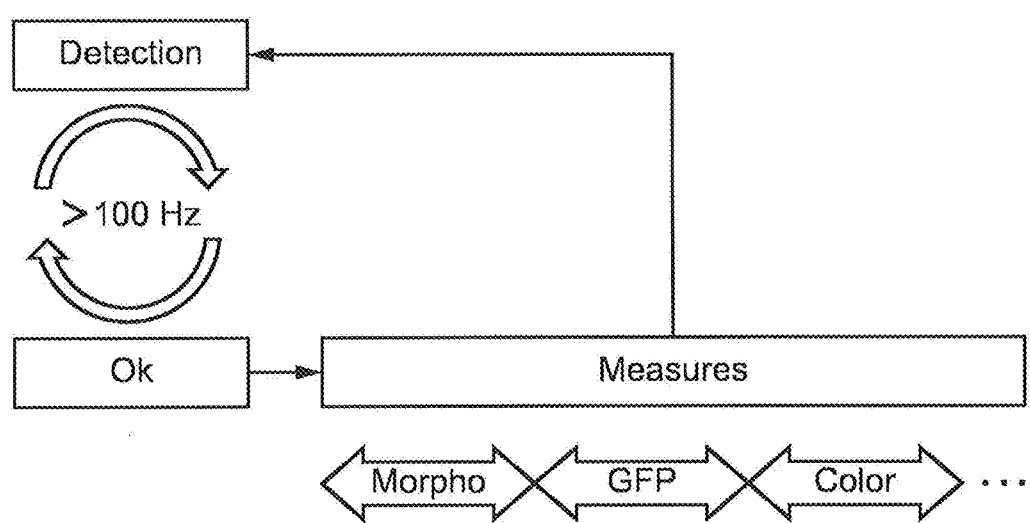
FIG. 19 is a diagram illustrating an image acquisition sequence comprising four successive different modalities.

FIG. 19 illustrates an example of an image acquisition sequence comprising four successive different modalities:

a detection of the falling corn ear 1 in the imaging module by two 100 Hz cameras to trigger the images acquisitions, a first morphological image acquisition is done by the cameras of the described imaging module to acquire images of the outer surface of the corn ear, these images allow identification on the number of kernels, the surface of the kernels, the volume of the kernels, a second GFP image acquisition is done with the same imaging module but with a lightening with specific wavelength, to discriminate the kernels presenting the genetic modification and exhibit fluorescence, the proportion of transgenic kernel on the ear can so be known, volume, area or morphological specificity of transgenic kernel should be observed, a third color image acquisition is done by at least two color cameras to acquires a qualitative information of the color of the outer surface of the corn ear. This information gives qualitative information on the ear (variety, maturity, disease symptoms) but can also help in the calibration (determination of threshold) for images analyses from the first step.

Figure 20:
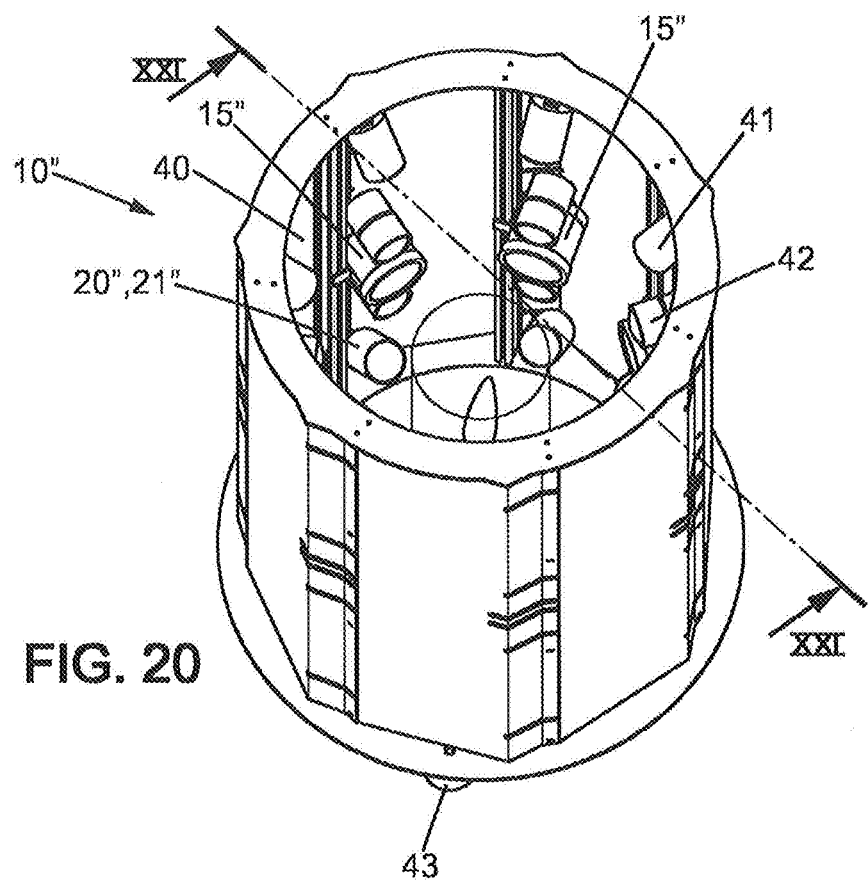
FIG. 20 is a schematic representation of an imaging module of an apparatus according to a further alternative embodiment of the invention.
Figure 21:
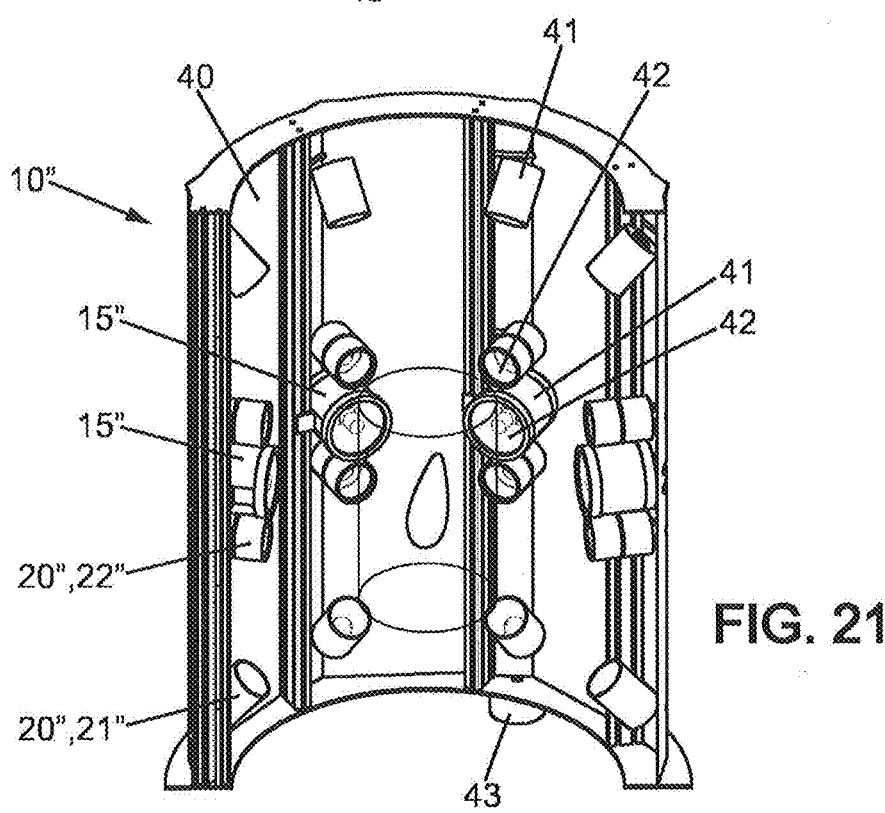
FIG. 21 is a view along line XXI-XXI of the imaging module of FIG. 20.

FIGS. 20 and 21 illustrate an imaging module 10" comprising seven imaging devices 15" arranged in a regular polygon with a distance D measured perpendicularly to the central axis A" of 0.86 m. The imaging module 10" comprises lightening devices 20", including first lightening devices 21" and second lightening devices 22" associated respectively with the imaging devices 15" as previously disclosed.

In this particular embodiment, D, R and a can be such that $D<2R\alpha$. Such imaging module 10" can be mounted adjacent to another similar imaging module 10" on a two rows corn picker.

The imaging module 10" may further be constructed in order to minimize external lightening, and background 40 is chosen for a best detection of the ear edge and contrast of ear images. The imaging devices 15" as well as the lightening devices 20" can be protected from dust and humidity. For example, these can be integrated in one or more sealed chambers 41 delimited by a transparent wall 42, for example made of Plexiglas or glass, with physical property or coating providing for example scratch resistance or frog deposit prevention. Anti-vibratory blocks 43 can be adapted to the device to maximize the image capture during movement of the device in the field.

In such implementation, elementary images are preferably acquired in sequence, namely the imaging devices 15" acquire the corresponding elementary images successively. Lightening is also performed sequentially and synchronized with the imaging devices, a light pulse by each lightening device 20" being synchronized with the imaging device. For example, for a dropping speed of the ear of 4 m/s, the seventh images on the outer surface of the ear can then be acquired within 360 micro seconds, the movement of the ear is only of 1.5 mm between the first elementary image and the last (seventh) image elementary images. Such shifting is compatible with the 3D reconstruction of an image of the outer surface of the ear by the image processing previously disclosed.

The invention claimed is:

1. A method for imaging a corn ear having an outer surface, the method implementing an imaging module having a field of view that enables an image of the outer surface of the corn ear to be acquired,
wherein the field of view of the imaging module is outwardly delimited by a cylindrical surface of revolution along a vertical axis,
wherein the imaging module comprises a frame having a central axis and an odd number of imaging devices mounted on the frame about the central axis so that the vertical axis is aligned with the central axis, and the number of imaging devices being three or more,
wherein each imaging device has an elementary field of view that enables an elementary image of a portion of the outer surface of the corn ear to be acquired, the imaging devices being arranged so that a composition of the elementary images forms the image of the outer surface of the corn ear, the elementary field of view of each imaging device presenting an angle of view in the transverse plane,
wherein the imaging devices are each arranged at a first distance from the central axis, in a same transverse plane perpendicular to the central axis and equally distributed about the central axis, two adjacent imaging devices being spaced apart from each other of a second distance, the second distance being greater than double the first distance multiplied by a measurement in radian of the angle of view, and the imaging devices are arranged so that no imaging device is present within the elementary field of view of each imaging device,
the method comprising the step consisting in dropping the corn ear within the field of view of the imaging module and acquiring an image of the outer surface of the corn ear while the corn ear drops within the field of view of the imaging module along the central axis of the frame and the vertical axis of the field of view, in which each imaging device is adapted to acquire a series of images according to a control signal comprising successive exposition pulses separated by time intervals, and during the step of dropping the corn ear and acquiring the image, for each imaging device, one first light pulse is emitted towards the outer surface of the corn ear during a first exposition pulse, and one second light pulse is emitted towards said outer surface of the corn ear during a second subsequent exposition pulse.

2. The method according to claim 1, wherein the field of view of the imaging module has a vertical length along the vertical axis that is superior to a maximum size of the corn ear.

3. The method according to claim 1, wherein the imaging module further comprises at least one lightening device adapted to lighten the outer surface of the corn ear with a light at a wavelength enabling a trait of the corn ear to be revealed on at least one of the elementary images of portions of the outer surface of the corn ear, and
wherein during the step of dropping the corn ear and acquiring the image, for each imaging device, light is emitted towards the outer surface of the corn ear.

4. The method according to claim 3, wherein the at least one lightening device comprises at least a first lightening device adapted to emit the first light pulse at a first wavelength enabling a first trait of the corn ear to be revealed, and a second lightening device adapted to emit the second light pulse at a second wavelength enabling a second trait of the corn ear to be revealed.

5. The method according to claim 1, further comprising the steps consisting in:
picking the corn earn in the crop area,
implementing the imaging module in a crop area on which corn ears are harvested and
wherein the step of dropping the corn ear and acquiring the image is performed in the crop area.

6. The method for phenotyping at least one corn ear comprising the steps consisting in:
implementing the method for imaging the corn ear according to claim 1, and
processing the image of the outer surface of the corn ear to evaluate at least one trait of the corn ear, said trait being in particular chosen among: an ear length, an ear width, an ear total area of the outer surface, an ear volume, a number of kernel rows, a kernel number, a kernel length, a kernel width, a kernel area, an ear length of filled kernels, an ear filled kernel area, an ear cob area, an ear area of aborted kernels and an ear fertilized volume.

7. The method according to claim 6, wherein the steps of implementing the method for imaging the corn ear and of processing the image of the outer surface of the corn ear are performed for a plurality of corn ears from a same crop area, and
wherein the method further comprises a step consisting in predicting a yield of said crop area.

8. An imaging module for implementing the method according to claim 1, the imaging module having a field of view that enables an image of an outer surface of a corn ear to be acquired, the field of view of the imaging module being outwardly delimited by a cylindrical surface of revolution along a vertical axis.

9. The imaging module according to claim 8, wherein the imaging module further comprises at least one lightening device adapted to lighten the outer surface of the corn ear with a light at a wavelength enabling a trait of the corn ear to be revealed on at least one of the elementary images of portions of the outer surface of the corn ear.

10. The imaging module according to claim 9,
wherein each imaging device is associated with at least one lightening device, each imaging device and the associated lightening device being aligned in a direction parallel to the central axis.

11. The imaging module according to claim 9, wherein the at least one lightening device comprises at least a first lightening device adapted to emit the first light pulse at a first wavelength enabling a first trait of the corn ear to be revealed, and a second lightening devices adapted to emit the second light pulse at a second wavelength enabling a second trait of the corn ear to be revealed.

12. An apparatus comprising at least one imaging module according to claim 8, wherein the apparatus is moveable and comprises at least a picking module adapted to pick the corn ear from a crop area and to convey said corn ear towards a dropping area where said corn ear is dropped within the field of view of the imaging module.

* * * * *